0-180° PHASE SHIFTER EMPLOYING TANDEM MULTIPLICATION AND DIVISION STAGES

Filed Dec. 21, 1967

INVENTOR.
THOMAS C. LEONARD
BY Wm. Nolan
ATTORNEY

United States Patent Office 3,538,446

Patented Nov. 3, 1970

3,538,446

0–180° PHASE SHIFTER EMPLOYING TANDEM MULTIPLICATION AND DIVISION STAGES

Thomas C. Leonard, Topsfield, Mass., assignor to Varian Associates, Palo Alto, Calif., a corporation of California Filed Dec. 21, 1967, Ser. No. 692,455

Int. Cl. H03b 3/04

U.S. Cl. 328—155 7 Claims

ABSTRACT OF THE DISCLOSURE

A 0–180° phase shifter (bi-phase modulator) is disclosed. The phase shifter includes a multiplication stage for multiplying the input signal by $n$ to produce an $n$-times output. The $n$-times output is then fed to a divider stage for division by $n$ to derive an output having the same frequency as the original signal. The divider circuit is capable of operating in two modes of operation having a relative phase shift of 180° therebetween. A control network is provided for shifting the mode of operation of the divider network between the two possible modes to produce a 180° phase shift in the output of the divider. Thus, an output is provided which can be shifted by 180° in variable accordance with a control signal. In a preferred embodiment, the control circuit includes a pickup for picking up a portion of the input signal to the phase shifter and shifting the phase of the input signal by a substantial amount and feeding the phase shifted signal into the divider network. When the phase shifted control signal as applied to the divider is greater than the energy in the existing operating mode it swamps the existing mode and causes the output of the divider to shift to the second mode. A gate or variable attenuator circuit is preferably provided between the multiplier and divider stages for selectively attenuating or interrupting the output of the multiplier, whereby the phase shifted control signal more easily swamps the operating mode of the divider to shift to the alternative control mode.

DESCRIPTION OF THE PRIOR ART

Heretofore, resistive, capacitive and inductive elements have been used in phase shifters for shifting the phase of an input signal by 180°. However, such phase shifters are found to be frequency sensitive in that the values of resistance, capacitance and/or inductance which are necessary to produce precisely 180° phase shift are frequency sensitive such that the phase shift once established at one frequency does not hold or give precisely 180° phase shift at other frequencies. Also it is found that such reactive elements are temperature sensitive such that phase shift is found to vary with temperature variations of the device.

SUMMARY OF THE INVENTION

The principal object of the present invention is the provision of an improved 0–180° phase shifter.

One feature of the present invention is the provision, in a 0–180° variable phase shifter, of a stage of multiplication for multiplying an input signal by $n$ followed by a divider stage for dividing the output of the multiplier by $n$ to produce an output having the same frequency as the original input signal to the multiplier. The divider stage is capable of operating in two modes of operation to produce either one of two output signals having 180° phase shift therebetween, and means is provided for shifting the mode of operation of the divider stage from one mode to the other to selectively switch the phase of the output signal by 180°.

Another feature of the present invention is the same as the preceding feature wherein the means for selectively switching the mode of operation of the divider stage includes a circuit for injecting a sample of the input signal to be phase shifted into the divider network to cause the divider to shift to one of its possible modes.

Another feature of the present invention is the same as any one or more of the preceding features wherein the control means for controlling the operating mode of the divider circuit includes a gate or variable attenuator means for periodically attenuating or interrupting the $n$-times input to the divider to cause the mode of operation in the divider circuit to shift from one mode to another.

Other features and advantages of the present invention will become apparent upon a perusal of the following specification taken in connection with the accompanying drawings wherein:

DESCRIPTION OF THE PREFERRED EMBODIMENTS

Figure 1:
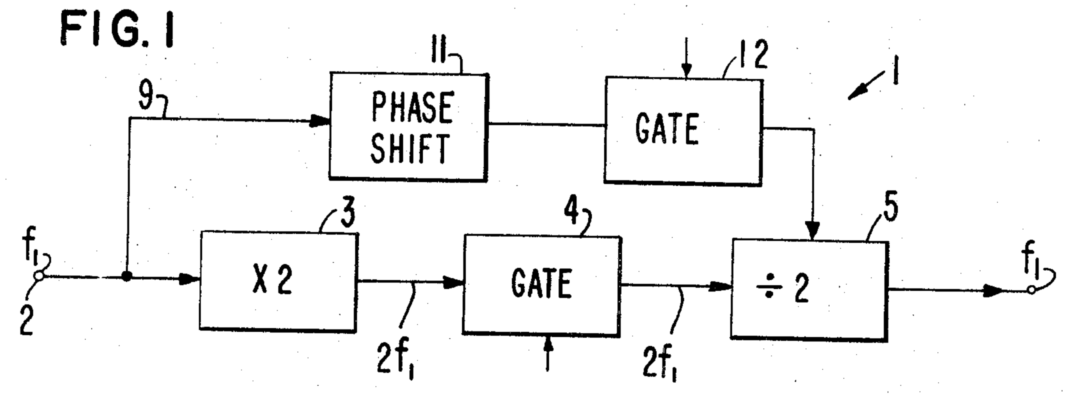
FIG. 1 is a schematic block diagram of a 0–180° phase shifter employing features of the present invention.

Referring now to FIG. 1 there is shown a phase shifter 1 incorporating features of the present invention. An input signal having a frequency $f_1$, which it is desired to phase shift, is applied at input terminal 2. A sample of the input signal $f_1$ is fed to a multiplier 3 wherein it is multiplied by $n$, where $n$ is any integer value greater than 1 and preferably equal to 2. The output of the multiplier 3 is fed to the input of a gate circuit 4 for periodically interrupting or attenuating the output of the multiplier 3 as fed to the input of a divider 5. The divider 5 divides the output of multiplier 3 by an integer value $n$ which is the same as the integer value employed in the multiplier 3 to produce an output $f_1$ having a frequency equal to the input frequency $f_1$.

Figure 3:
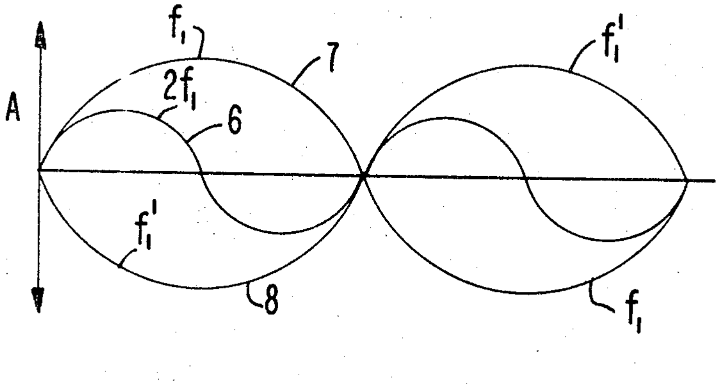
FIG. 3 is a plot of signal amplitude vs. time depicting the signal wave patterns within the divider network of FIGS. 1 and 2 and depicting the 180° phase shifted outputs of the divider.

The divider circuit 5 is capable of operating in two possible modes. In a first mode the $nf_1$ input frequency is shown at 6 in FIG. 3 (where $n=2$) and is divided to produce an output signal having a frequency and phase as indicated at 7. The divider has a second mode of operation which divides the input signal $2f_1$, as indicated at 6, to produce an output $f_1'$, indicated at 8. Outputs 7 and 8 are at the same frequency and differ only in that their phase is shifted by 180° relative to each other. It will be found that one of the phases such as, for example, signal 7 is the preferred mode within the divider such that the divider will naturally select this output mode in preference to the other possible mode.

Therefore, a control signal is derived which is fed into the divider circuit 5 in an out-of phase relation with the divider preferred output signal or mode. The control signal has an amplitude greater than the amplitude of the existing mode of oscillation such that it swamps the oscillation in the divider preferred mode causing the divider circuit 5 to switch from the preferred mode to the second mode. Once the second mode has been established the divider continues to operate in that mode until a second control signal is applied to the divider which will cause the divider to switch back to the preferred mode.

Referring back to FIG. 1, the mode control signal is derived from the input terminal 2 of the phase shifter 1 via lead 9 and fed through a phase shifter 11 which shifts its phase relative to the phase of the input signal $f_1$ by a substantial amount and preferably near 180°. The output of the phase shifter is fed via a gate circuit 12 into the divider network 5 for swamping out the divider preferred mode of oscillation therein and causing the divider to switch to the second mode controlled by the control signal as injected into the divider 5.

In operation, gate 12 is closed and gate 4 is opened. This establishes the preferred oscillating mode for the divider 5 to produce the preferred mode output phase as indicated by trace 7 of FIG. 3. When it is desired to shift the phase of the output of the divider 5 by 180°, gate 12 is opened and gate 4 is closed for an instant of time such that the control signal, derived from gate 12, has a greater amplitude than the existing oscillation of the internally preferred mode within the divider 5. This occurs since the preferred mode has now been temporarily attenuated or interrupted due to the closing of gate 4. Thus, the control mode signal, by virtue of being larger than the signal of the preferred mode, overcomes or swamps out the preferred mode and the output of the divider 5 shifts from mode 7 to mode 8, resulting in a 180° phase shift in the output of the divider 5. Once control is shifted from mode 7 to mode 8 gate 4 is opened and the device continues to operate in mode 8. To shift from mode 8 to mode 7 gate 12 is closed and gate 4 is pulsed closed for a very short instant of time such that the mode 8 oscillations in the divider reduce to a low amplitude. Gate 4 is then opened while gate 12 remains closed such that the divider network 5 switches over to its preferred mode of operation, indicated as mode 7.

Figure 2:
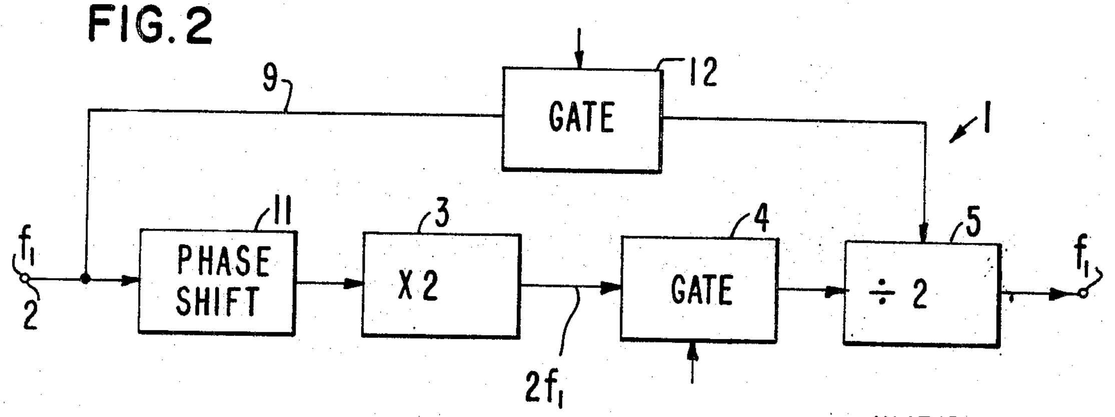
FIG. 2 is a schematic block diagram of an alternative phase shifter incorporating features of the present invention.

Referring now to FIG. 2 there is shown an alternative embodiment of the present invention. In this embodiment, the phase shifter circuit 1 is substantially the same as that shown in FIG. 1 with the exception that the phase shifter 11 is moved from the control channel 9 in the tandem multiplier and divider channel in order to obtain a relative phase shift between the control signal injected into the divider 5 and the phase of the input signal to the multiplier 3. The mode of operation of the circuit of FIG. 2 is substantially identical to the mode of operation previously described for the circuit of FIG. 1.

In the embodiments of FIGS. 1 and 2, gate 4 could also be located at the input to the multiplier 3 just after lead 9.

Figure 4:
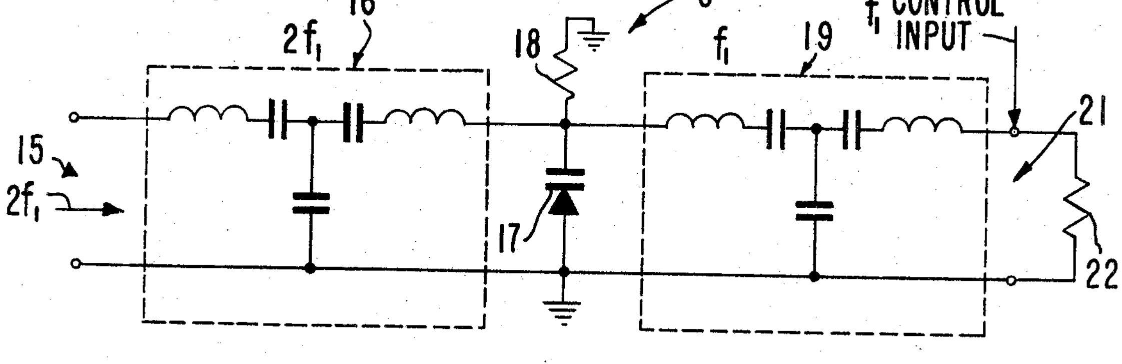
FIG. 4 is a schematic circuit diagram of a divider circuit incorporating features of the present invention.

Referring now to FIG. 4, there is shown a suitable divider network 5. The divider circuit 5 includes a two wire transmission line having input terminals 15 for receiving signals at a frequency of $2f_1$ derived from the output of the multiplier 3. The input applied to terminals 15 is fed through a tuned bandpass filter 16 tuned for a resonance at the frequency of the input signal, namely, $2f_1$. This input filter 16 may be omitted if an output $2f_1$ filter of the multiplier is employed in its place. The output of the bandpass filter 16 is applied across a varactor diode 17 which has one terminal thereof connected to ground via a biasing resistor 18 for developing the self-bias voltage on the varactor diode 17. A second bandpass filter 19 is tuned for a resonance at the frequency of the input signal to be phase shifted, namely, $f_1$ which corresponds to the $1/n$ subharmonic of the input signal to the divider 5. The bandpass filter 19 passes the subharmonic output at $f_1$ to the output terminals 21 and thence to a suitable load indicated by load resistor 22.

The injected $f_1$ control input signal, derived from the control channel via lead 9 and gate 12, is injected into the divider network 5 at the output terminal 21. The injector control input signal is passed through the output bandpass filter 19 to the varactor diode 17 for swamping out preferred mode $f_1$ oscillations in the tuned circuit which includes the output bandpass filter 19 and the varactor diode 17 and switching the operating mode of the divider 5 to the control mode.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a 0–180° phase shifter, means forming an $n$-times multiplier for multiplying the frequency of a continuous wave input signal to be phase shifted, means forming an $n$-times divider for dividing the multiplied output frequency of said $n$-times multiplier means to produce an output signal of a frequency equal to the frequency of the input signal to be phase shifted, said divider being capable of operating in two possible modes to provide its output signal with either of two possible phases having a relative phase shift of 180° therebetween, and control means for selectively shifting the operating mode of said divider means from one mode to the other to selectively shift the output phase by 180°.

2. The apparatus of claim 1 wherein said control means for shifting the operating mode of said divider means includes, means for sampling a portion of the signal to be phase shifted, a phase shifter for producing a relative phase shift between the input signal to be phase shifted and the sampled portion of the input signal, and means for feeding the sampled signal portion into said divider means to control an operating mode of said divider means.

3. The apparatus of claim 1 where $n$ is 2.

4. The apparatus of claim 1 wherein said divider means includes, a non-linear voltage variable capacitance, means forming an input for passing the output frequency of said multiplier means to said voltage variable capacitance, means forming an output bandpass filter tuned for resonance at the $1/n$ subharmonic of the multiplied input frequency and connected to pass signals at the output frequency of said divider means from said voltage variable capacitance to an output of said divider means.

5. The apparatus of claim 4 wherein said control means feeds the control signal at the $1/n$ subharmonic frequency into the circuit portion including said output bandpass filter of said divider means and said voltage variable capacitance.

6. The apparatus of claim 2 including means for periodically attenuating the multiplied input to said divider means such that the control signal as fed to said divider means serves to shift the operating mode of said divider means during the time the multiplied input to divider means is attenuated.

7. The apparatus of claim 2 including, means for gating the sampled control signal portion as injected into said divider, and means for gating the multiplied input signal to said divider means for shifting operating modes within said divider means.

References Cited

UNITED STATES PATENTS

| | | | |
|---|---|---|---|
| 3,189,832 | 6/1965 | Pugh | 328—42 |
| 3,202,769 | 8/1965 | Coleman | 328—155 |
| 3,446,947 | 5/1969 | Overstreet | 307—220 |
| 3,453,552 | 7/1969 | Whang | 328—155 |

DONALD D. FORRER, Primary Examiner

D. M. CARTER, Assistant Examiner

U.S. Cl. X.R.

307—220, 295; 328—25